Feb. 24, 1948.  K. C. D. HICKMAN  2,436,693
VACUUM DEHYDRATION PROCESS INCLUDING EVOLVED VAPOR CONDENSATION
Filed Oct. 18, 1944
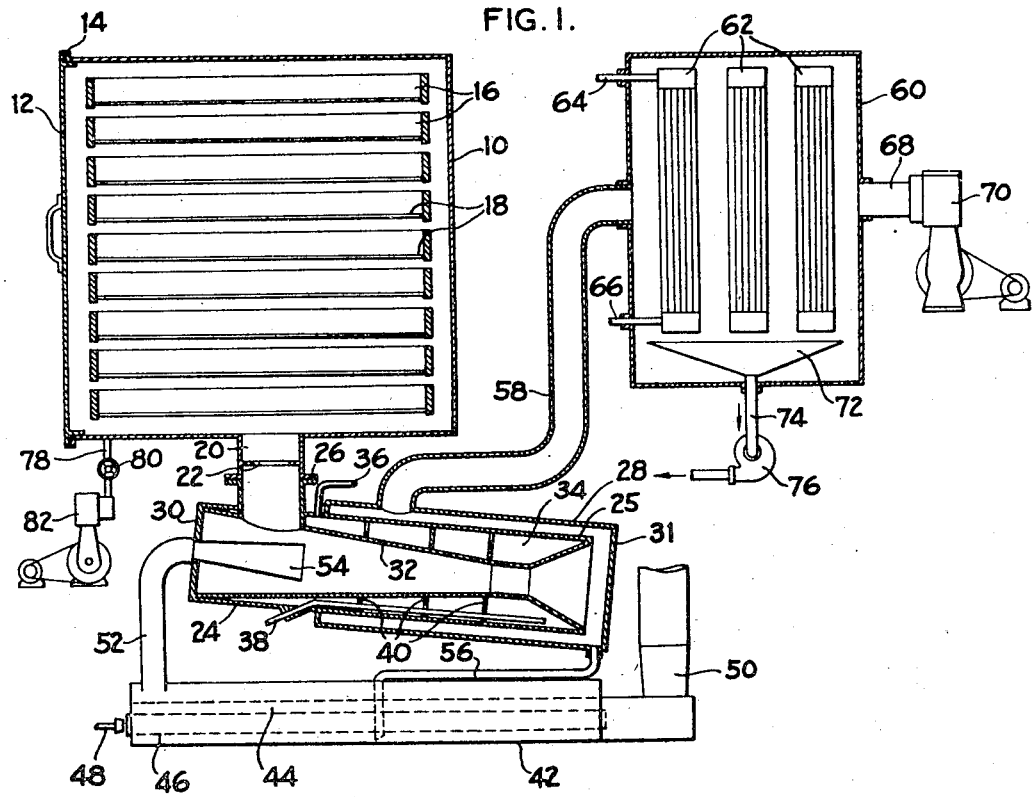
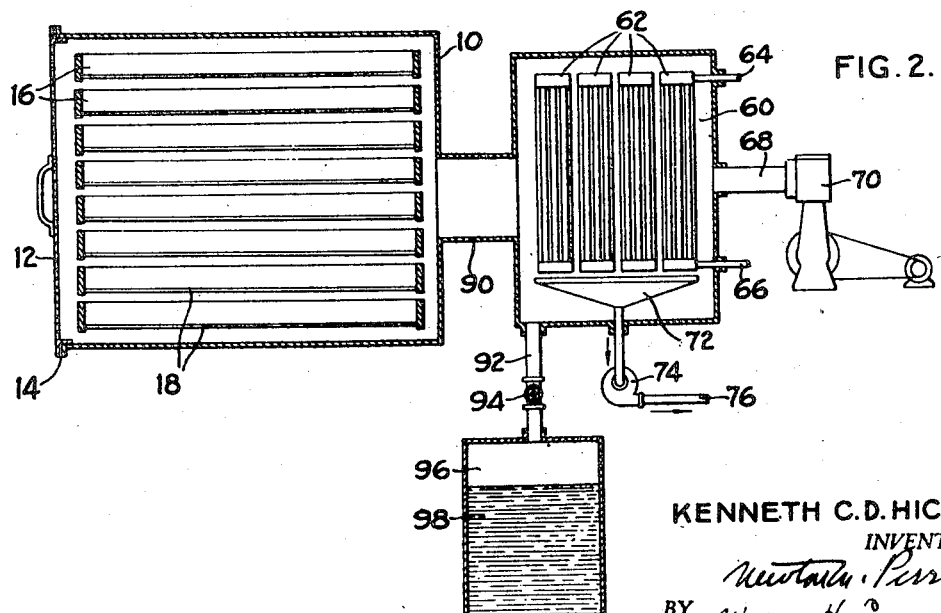
KENNETH C.D. HICKMAN
INVENTOR Patented Feb. 24, 1948

2,436,693

UNITED STATES PATENT OFFICE 2,436,693

VACUUM DEHYDRATION PROCESS INCLUDING EVOLVED VAPOR CONDENSATION

Kenneth C. D. Hickman, Rochester, N. Y., assignor to Distillation Products, Inc., Rochester, N. Y., a corporation of Delaware Application October 18, 1944, Serial No. 559,190

5 Claims. (Cl. 34—5)

This invention relates to improved procedure for dehydration under vacuum and in particular to vacuum dehydration of substances while in the frozen state.

The dehydration of substances under vacuum and while in the frozen state is well known. This procedure requires the use of a vacuum amounting to less than 4.7 mm. since this is the vapor pressure of a mixture of water and ice. This, of course, means that the water vapors removed have an enormous volume. The removal of this large volume of water vapor at these low pressures has given considerable trouble. One of the most common methods of removing water vapor is to condense it in the form of ice on a highly cooled surface. This procedure is inefficient because the ice accumulates on the condensing surface and since ice is not a good transmitter of heat, the layer of ice becomes less efficient as it increases in thickness. Condensation of the water vapor, therefore, is less efficient toward the last part of the dehydration process when small volumes of water vapor are to be removed and when high efficiency is desired. Also, this prior art procedure required discontinuation of the dehydration operation in order to remove ice from the condenser.

My invention has for its object to avoid the above-mentioned difficulties in vacuum dehydration, particularly in the frozen state. Another object is to provide improved vacuum dehydration procedure. Still another object is to provide improved procedure for dehydrating in the frozen state whereby the water vapor is removed from the dehydration system in the form of liquid water. Another object is to provide economical procedure for dehydration in the frozen state. Another object is to improve the state of the art. Other objects will appear hereinafter.

These and other objects are accomplished by my invention which includes removing the water in the form of vapor from the substance to be dehydrated by exposing it to a pressure below 4.7 mm. while in a frozen condition, compressing the water vapors thus removed, contacting these compressed water vapors with a cooling agent which is adapted to condense in the form of liquid water the largest amount of water vapor given off during the process and to condense in the form of ice the smallest amount of water given off during the process. My invention also includes removing water vapor from the substance to be dehydrated by exposing it to a vacuum, condensing these water vapors with the vapors of a substance which lowers the freezing point of water and removing the condensed liquid mixture from the system.

In the following description I have set forth several of the preferred embodiments of my invention but it is to be understood that these are given by way of illustration, and not in limitation thereof.

In the accompanying drawings wherein like numbers refer to like parts, I have illustrated two preferred embodiments of my invention wherein:

Fig. 1 is a vertical elevation partly in section illustrating suitable apparatus for dehydrating in the frozen state, and condensing the water vapor either as ice or water depending on the volume of water given off, and Fig. 2 is a vertical section partly in elevation of apparatus suitable for carrying out dehydration procedure with freezing of the water vapor removed, and removal of the water vapor by solvent action.

Referring to Fig. 1, numeral 10 designates a gas-tight dehydration chamber provided with a removable door 12 making a gas-tight contact with casing 10 by means of gasket 14. Numeral 16 designates a plurality of trays heated by circulation of heating fluid through coil 18 integral with the base thereof. Numeral 20 designates a large-diameter conduit connected to the base of chamber 10 which is provided with a wide aperture valve 22 and which connects to the intake side of booster pump 24 by means of gastight flange 26.

Booster pump 24 comprises cylindrical pump casing 25 which is integral with a jacket 28 provided with end plates 30 and 31. Diffuser tube 32 is centrally positioned within casing 25 and is integral therewith at each end thereof. Intake conduit 20 is integral with diffuser tube 32 at the low pressure end of the pump. A space 34 is thus formed between diffuser tube 32 and casing 25 and through this space cooling fluid is circulated by introduction through conduit 36 and removed through conduit 38. Numeral 40 designates a plurality of baffles to impart a tenuous path to this cooling fluid. Numeral 42 designates a closed gas-tight cylindrical boiler which contains a stable organic fluid 44 which is provided with a heating tube 46 and gas heater 48. Numeral 50 designates a chimney for the waste combustion gases which are expelled from the opposite end of the boiler tube 46. Numeral 52 designates a conduit connecting boiler 42 with the ejector nozzle 54. Numeral 56 designates a conduit for returning the spent pump fluid in liquid form to the bottom of the boiler 42.

Numeral 58 designates a conduit connecting the exhaust side of the pump to condensing chamber 60 which is gastight, and which contains a number of refrigerated coils 62 which are cooled by circulation of cold refrigerating fluid through conduits 64 and 66. Numeral 68 designates a conduit connecting condensing chamber 60 with roughing pump 70. Numeral 72 designates a funnel positioned below cooling coils 62, the bottom portion of which connects conduit 74 which is in turn connected to withdrawal pump 76. Numeral 78 designates a conduit connected to the dehydrating chamber 10 which conduit is provided with a valve 80 and which is connected to a roughing pump 82.

Referring to Fig. 2, numeral 90 designates a wide-aperture conduit which directly connects dehydration chamber 10 with condensing chamber 60. Condensing chamber 60 is provided with another conduit 92 which connects through valve 94 to gas-tight container 96 which contains a liquid 98 which has the property of reducing the freezing point of water.

In operating the apparatus illustrated in Fig. 1, the material to be dehydrated is introduced into trays 16. This material may be frozen before introduction if dehydration in the frozen state is contemplated, or it may be frozen in the trays during operation by rapid removal of the water vapor. Plate 12 is then closed, valve 80 is closed, and roughing pump 70 is put into operation. Cooling fluid is circulated through cooling coils 62. When the roughing pump 70 has brought the pressure to a satisfactory low value, burner 48 in the booster pump 26 is put into operation and cooling fluid is circulated through conduits 36 and 38. Gases from burner 48 pass through boiler tube 46 and heat the pump fluid 44 to vaporizing temperature. Spent gases pass out of the boiler through stack 50. Vapors of the pump fluid 44 pass up through conduit 52, and are ejected through nozzle 54 as a high velocity stream. This high velocity stream entrains water vapors passing through conduit 20 and these water vapors are forced to the opposite end of diffuser tube 32. The spent pump vapors are condensed on the walls of diffuser tube 32 by the cooling action of the water in space 34. This pump fluid flows as a liquid into conduit 56 and is returned to boiler 42. The water vapors remain uncondensed and pass through the space between 25 and 28 and thence into conduit 58 which leads them to condensing chamber 60. Here the vapors are condensed on condensing coils 62, and the condensate flows into funnel 72 and is withdrawn as liquid water by pump 76. Heating of the material being dehydrated is advisable to increase the rate of vapor evolution and this is accomplished by circulating heating fluid through coils 18 which are in thermal contact with the base of the dehydrating trays.

The amount and temperature of refrigerating fluid circulated through refrigerating coils 62 is adjusted so that when the amount of water vapor given off in the dehydration chamber 10 is large the vapor will be condensed on 62 as water, and so that when the water vapor given off in chamber 10 is small, i. e., at the final stage of the dehydration, the water vapor will be condensed as ice on refrigerating coils 62. By suitable adjustment of the refrigerating fluid in respect to its volume and temperature, cooling coils 62 may be caused to permit only a limited layer of ice to build up. If more water vapor condenses the refrigerant is unable to maintain the layer in frozen condition and the vapor will condense as liquid water at approximately the temperature of ice. This water will gradually melt the ice and all of the condensate will thus be withdrawn from the system by pump 76 in the form of liquid water. When dehydrating in the frozen state dehydration chamber 10 must be at a pressure below 4.7 mm. (the vapor pressure of a mixture of ice and water). Usually the pressure of such dehydrations is about .3 mm. which corresponds to ice at −30° C. The water vapor removed from the dehydration chamber under such conditions is compressed by pump 24 to a pressure of about 5 mm. The condensing coils 62 can be adjusted so that water vapor at this pressure is efficiently condensed either in the form of ice or in the form of liquid water depending upon the volume.

The pump fluid used in boiler 42 is preferably a low vapor pressure organic fluid and the pump is preferably of the type described in Hickman and Kuipers application No. 443,732, filed May 20, 1942, now United States Patent Number 2,379,436. The pump may be multi-stage ejector type, if desired. Also pump fluids other than organic fluids may be used, thus, for instance, mercury may be employed although it is not as satisfactory.

The assembly illustrated in Fig. 1 has valuable characteristics when used for an intermittent cycle of dehydration such as is preferred for dehydration of substances such as blood plasma or penicillin. In such a cycle it is desirable to have a large extraction capacity at the beginning of the dehydration procedure at which time allowance of pressure is not a critical factor. Later in the dehydration operation it is desirable to have low operating pressure in order to remove the last traces of water but the extraction capacity is of less importance. The invention provides a dehydration process having these desirable characteristics. Thus, suppose that the dehydration chamber 10 contains frozen penicillin broth and that it is nearing the end of the drying cycle. The broth is almost completely dehydrated and very little vapor is being transferred to the condenser. The temperature of the condenser will now fall to well below zero and the surface of the condenser will be coated by a layer of ice. The small quantity of water vapor continuing to condense as ice will do so at a temperature of below zero, say 10° below 0° C. This is in equilibrium with 0.8 mm. of Hg which is approximately the backing pressure against which the booster pump need now operate. For this low pressure the heat input to the booster pump may be diminished whereupon, the speed and ultimate vacuum of pump 24 both greatly improve and the cycle of dehydration becomes completed under optimum conditions.

The valve 22 between the cabinet and the booster pump is now shut off while the dehydrating chamber is unloaded and recharged with a new batch of penicillin. The roughing pump 82 brings the pressure in the chamber to below 3 mm. of Hg and simultaneously the heat input to the booster pump is increased. The roughing pump is shut off, valve 80 is closed, and valve 22 between the dehydrating chamber and the booster pump is opened. There is an immediately excessive egress of water vapor through the booster pump to the condenser 60 which now has a large reserve of ice, from the previous operation, upon which the water deposits. The melted ice and the condensed water vapor together run out of the condenser which is now operating temporarily above the normal capacity of the refrigeration compressor. At the same time the booster pump is operating under high heat input against its highest backing pressure. Soon the flow of water vapor will diminish and a period of normal operation will set in at which both the refrigerator unit and the booster pump are operating under optimum normal conditions. This phase will be succeeded by the one first described thus completing the cycle. Pump 24 is not designed to operate against atmospheric pressure and pump 70 serves to evacuate condensing chamber 60 and pump 24 so that booster pump 24 can take over and further reduce the pressure in dehydration chamber 10.

It is to be noted that a freezing trap such as described in Flosdorf No. 2,163,996, has exactly the reverse characteristics. Thus the vacuum is best at the beginning of the dehydration cycle and worst at the finish of the dehydration cycle when the condenser is loaded with ice.

In operating the apparatus illustrated in Fig. 2, the material to be dehydrated is introduced as previously described and condensing coils 62 and pump 70 are put into operation. Valve 94 is opened to permit sufficient vapor to enter to form a low melting eutectic mixture with the water vapors. These vapors pass upwardly through conduit 92 and come into contact with the coils 62 and are condensed thereon with the water vapors from chamber 10. They form a low melting point solution with the water condensate. This liquid solution drops into funnel 72 and is withdrawn from the system by pump 74. Solvent vapor is prevented from getting back into chamber 10 by the rush of water vapor emerging therefrom. Of course, the mixture of melted ice and solvent which is expelled from the system can be distilled and and the solvent reused in the process. Suitable solvents are ethyl, methyl, and isopropyl alcohols and acetone. A calibrated orifice may be used in place of valve 94 to permit the proper amount of solvent vapors to flow into the system.

A natural compensation occurs with this system which is analogous to that existing with the simpler system described previously. Suppose that an eutectic mixture consists of one part of water and one part of solvent. Suppose, however, that a worthwhile lowering of freezing point occurs with a mixture of one part of solvent with ten parts of water. Suppose further that a small constant stream of solvent vapor is emitted, said stream remaining constant throughout the cycle of dehydration. At first much water will be given off from the relatively wet, warm charge and this will be condensed at a relatively high temperature with a small proportion of solvent under conditions evidently permissible at the start. As drying proceeds and the vapor pressure falls, the quantity of water vapor also falls, the melting point of the condensate falls; but the supply of power to the condensate coils being approximately constant, the temperature of refrigeration falls. Finally drying is accomplished under very high vacuum with a very low-temperature eutectic mixture dripping off the very cold coils.

The temperature of condenser 60 can be adjusted in the modification illustrated in Fig. 2, so that large amounts of solvent vapor are not required. Thus, if dehydration chamber 10 is at a pressure of 1 mm. corresponding with a temperature of −8° C., the condensing coils 62 could be maintained at a temperature of −12° C. The container 96 would be filled with isopropyl alcohol and upon opening valve 94 it would slowly be vaporized and would deposit on the condensing coils 62 to form a eutectic mixture of water and isopropyl alcohol which is liquid at −12° C. and which can thus be withdrawn from the apparatus in liquid form. It is not necessary that pure solvent be used; for instance, the withdrawn mixture can be treated merely to enrich the solvent contained therein and the enriched mixture then reused.

What I claim is:

1. The process of vacuum dehydration which comprises removing the water in the form of vapor from the substance to be dehydrated by exposing it to a vacuum, compressing the water vapor thus removed and contacting the compressed water vapor with a cooling agent, condensing in the form of liquid water the largest amount of water vapor given off during early stages of the process and condensing in the form of ice the smallest amount of water vapor given off during later stages of the process.

2. The process of vacuum dehydration which comprises removing the water in the form of vapor from the substance to be dehydrated by exposing it to a relatively high vacuum while it is in a frozen condition, compressing the water vapor thus removed to above 4.7 mm. Hg and contacting the compressed water vapor with a cold surface, condensing in the form of liquid water the largest amount of water vapor given off during early stages of the process and condensing in the form of ice the smallest amount of water vapor given off during later stages of the process.

3. The process of vacuum dehydration which comprises removing the water in the form of vapor from the substance to be dehydrated by exposing it in a dehydration system to a high vacuum while it is in a frozen condition, compressing the water vapors thus removed to at least 5 mm. of Hg, contacting the compressed water vapor with a cold surface, condensing in the form of liquid water the largest amount of compressed water vapor given off during initial stages of the process, condensing in the form of ice the smallest amount of compressed water vapor given off during final stages of the process, repeating the operation and melting the ice formed in the previous operation by means of the liquid water condensed on the cold surface during the succeeding operation and withdrawing all of this liquid water from the dehydrating system.

4. The process of vacuum dehydration which comprises removing water in the form of vapor from the substance to be dehydrated by exposing it to a vacuum, compressing the water vapor thus removed, condensing these compressed water vapors in the form of liquid water during the initial part of the dehydration process when large volumes of water vapor are given off, condensing the compressed water vapor in the form of ice during the last part of the process when a small volume of water vapor is given off, repeating the operation on a new charge of material to be dehydrated, the initial large volume of water vapor from the new charge being caused to melt the ice formed in the final stages of the first charge and withdrawing all of the condensate in the form of liquid water.

5. The process of vacuum dehydration which comprises removing water in the form of vapor from the substance to be dehydrated by exposing it to a relatively high vacuum while in the frozen state, compressing the water vapor thus removed to above 4.7 mm. of Hg, condensing these compressed water vapors in the form of liquid water during the initial part of the dehydration process when large volumes of water vapor are given off, condensing the compressed water vapor in the form of ice during the last part of the process when a small volume of water vapor is given off, repeating the operation on a new charge of material to be dehydrated, the initial large volume of water vapor from the new charge being caused to melt the ice formed in the final stages of the previous charge and withdrawing all of the condensate in the form of liquid water.

KENNETH C. D. HICKMAN.

REFERENCES CITED

The following references are of record in the file of this patent:

UNITED STATES PATENTS

| Number | Name | Date |
| --- | --- | --- |
| 2,302,253 | Reichel et al. | Nov. 17, 1942 |
| 2,345,548 | Flosdorf et al. | Mar. 28, 1944 |